(12) United States Patent
Chander et al.

(10) Patent No.: US 8,572,716 B2
(45) Date of Patent: Oct. 29, 2013

(54) INTEGRATING OPERATING SYSTEMS WITH CONTENT OFFERED BY WEB BASED ENTITIES

(75) Inventors: Girish Chander, Redmond, WA (US); Tanmoy Dutta, Redmond, WA (US); Cristian Ilac, Sammamish, WA (US); Bronislav Kavsan, Kirkland, WA (US); Ziquan Li, Redmond, WA (US); Andreas K. Luther, Kirkland, WA (US); Gennady Medvinsky, Redmond, WA (US); Liquiang Zhu, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1284 days.

(21) Appl. No.: 11/789,270

(22) Filed: Apr. 23, 2007

(65) Prior Publication Data

US 2008/0263651 A1 Oct. 23, 2008

(51) Int. Cl.
*H04L 29/06* (2006.01)

(52) U.S. Cl.
USPC .......................................................... 726/10

(58) Field of Classification Search
USPC ............................... 726/10, 19, 2, 9; 709/219
See application file for complete search history.

(56) References Cited

U.S. PATENT DOCUMENTS

| | | | | |
|---|---|---|---|---|
| 5,964,872 A * | 10/1999 | Turpin | | 713/1 |
| 6,336,115 B1 * | 1/2002 | Tominaga et al. | | 1/1 |
| 7,058,180 B2 | 6/2006 | Ferchichi et al. | | 380/247 |
| 7,100,195 B1 | 8/2006 | Underwood | | 726/2 |
| 2002/0112155 A1 | 8/2002 | Martherus et al. | | 713/155 |
| 2003/0130952 A1 * | 7/2003 | Bell et al. | | 705/51 |
| 2003/0182551 A1 | 9/2003 | Frantz et al. | | 713/170 |
| 2004/0002878 A1 | 1/2004 | Hinton | | 705/7 |
| 2004/0093515 A1 * | 5/2004 | Reeves, Jr. | | 713/201 |
| 2004/0093526 A1 * | 5/2004 | Hirsch | | 713/202 |
| 2004/0098615 A1 * | 5/2004 | Mowers et al. | | 713/201 |
| 2004/0117436 A1 * | 6/2004 | Newman et al. | | 709/203 |
| 2004/0123144 A1 | 6/2004 | Chan et al. | | 726/8 |
| 2004/0128270 A1 * | 7/2004 | Bachman et al. | | 707/1 |
| 2004/0162786 A1 * | 8/2004 | Cross et al. | | 705/59 |
| 2005/0074126 A1 | 4/2005 | Stanko | | 380/279 |
| 2005/0144463 A1 | 6/2005 | Rossebo et al. | | 713/185 |
| 2005/0154913 A1 | 7/2005 | Barriga et al. | | 726/4 |
| 2005/0262359 A1 * | 11/2005 | Palecek | | 713/185 |
| 2006/0041446 A1 * | 2/2006 | Aaron | | 705/1 |
| 2006/0195893 A1 | 8/2006 | Caceres et al. | | 726/8 |
| 2006/0236382 A1 | 10/2006 | Hinton et al. | | 726/8 |

(Continued)

FOREIGN PATENT DOCUMENTS

| | | |
|---|---|---|
| WO | WO 03/001324 | 1/2003 |
| WO | WO 2005/069823 | 8/2005 |

OTHER PUBLICATIONS

Fischer, A. et al., "Single Sign-On of Windows-based Web Service Clients using SAP Logon Tickets," *SAP; Collaboration Technology Support Center—Microsoft—Collaboration Brief*, 2006, 1-7.
Hewlett-Packard Development Company, L.P., "single sign-on capability," *hpinvent*, 2003, 1-12.

(Continued)

*Primary Examiner* — David Pearson
(74) *Attorney, Agent, or Firm* — Woodcock Washburn, LLC

(57) ABSTRACT

Example embodiments are provided for integrating operating systems with content offered by internet based entities.

19 Claims, 15 Drawing Sheets

(56) References Cited

U.S. PATENT DOCUMENTS

| | | | |
|---|---|---|---|
| 2006/0259592 A1* | 11/2006 | Angeline | 709/219 |
| 2007/0005961 A1* | 1/2007 | Hamblin et al. | 713/167 |
| 2007/0208686 A1* | 9/2007 | Gupta et al. | 707/1 |
| 2008/0196089 A1* | 8/2008 | Baron et al. | 726/5 |
| 2008/0275995 A1* | 11/2008 | Soliman et al. | 709/230 |

OTHER PUBLICATIONS

Semancik, "Internet Single Sign-On Systems: Research Report," *nLight*, 2005, 1.0, 1-18.

Upadhyay et al., "Single Sign-on Using Kerberos in Java," http://java.sun.com/j2se/1.4.2/docs/guide/security/jgss/single-signon.html, 2001, 19 pages.

\* cited by examiner

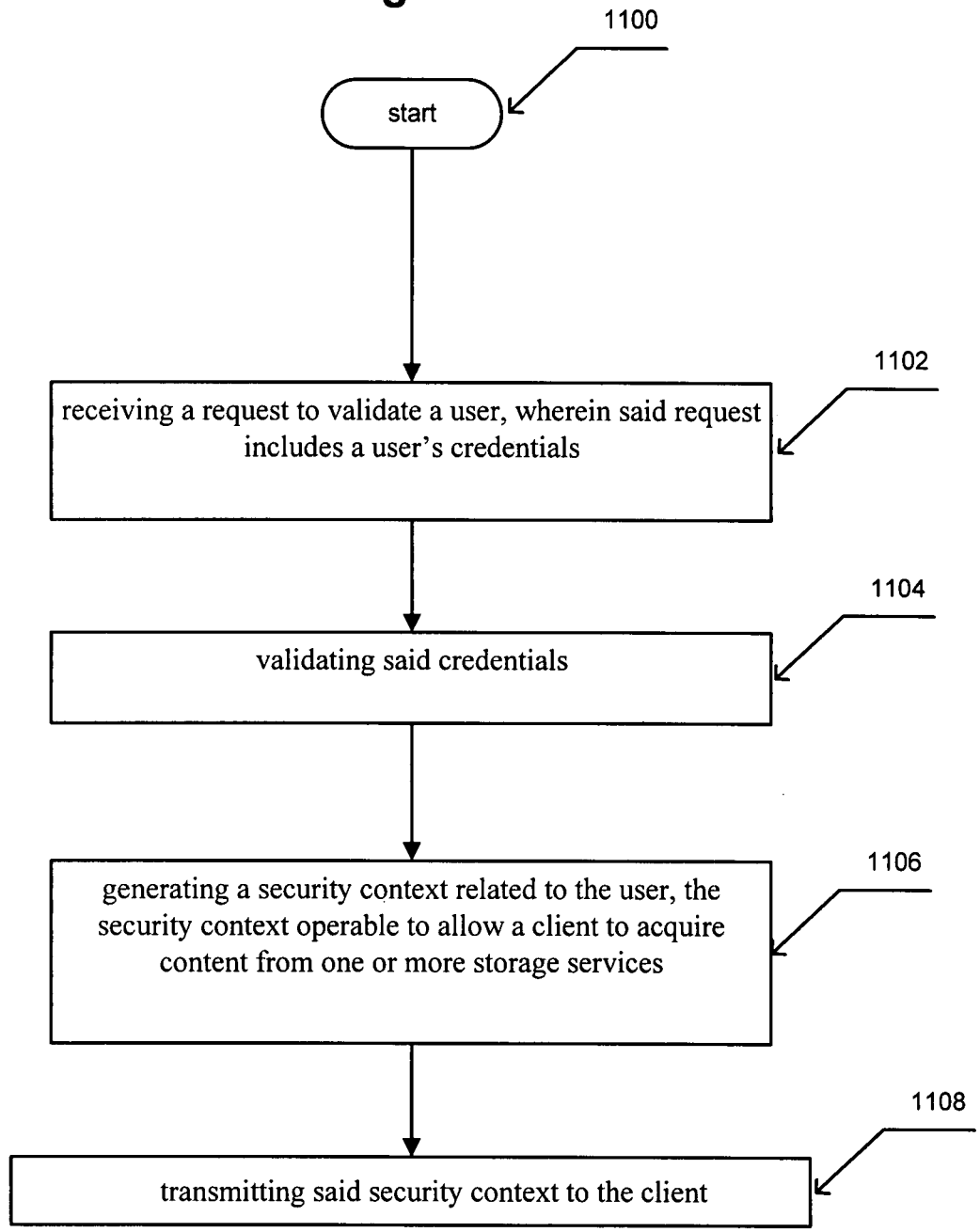

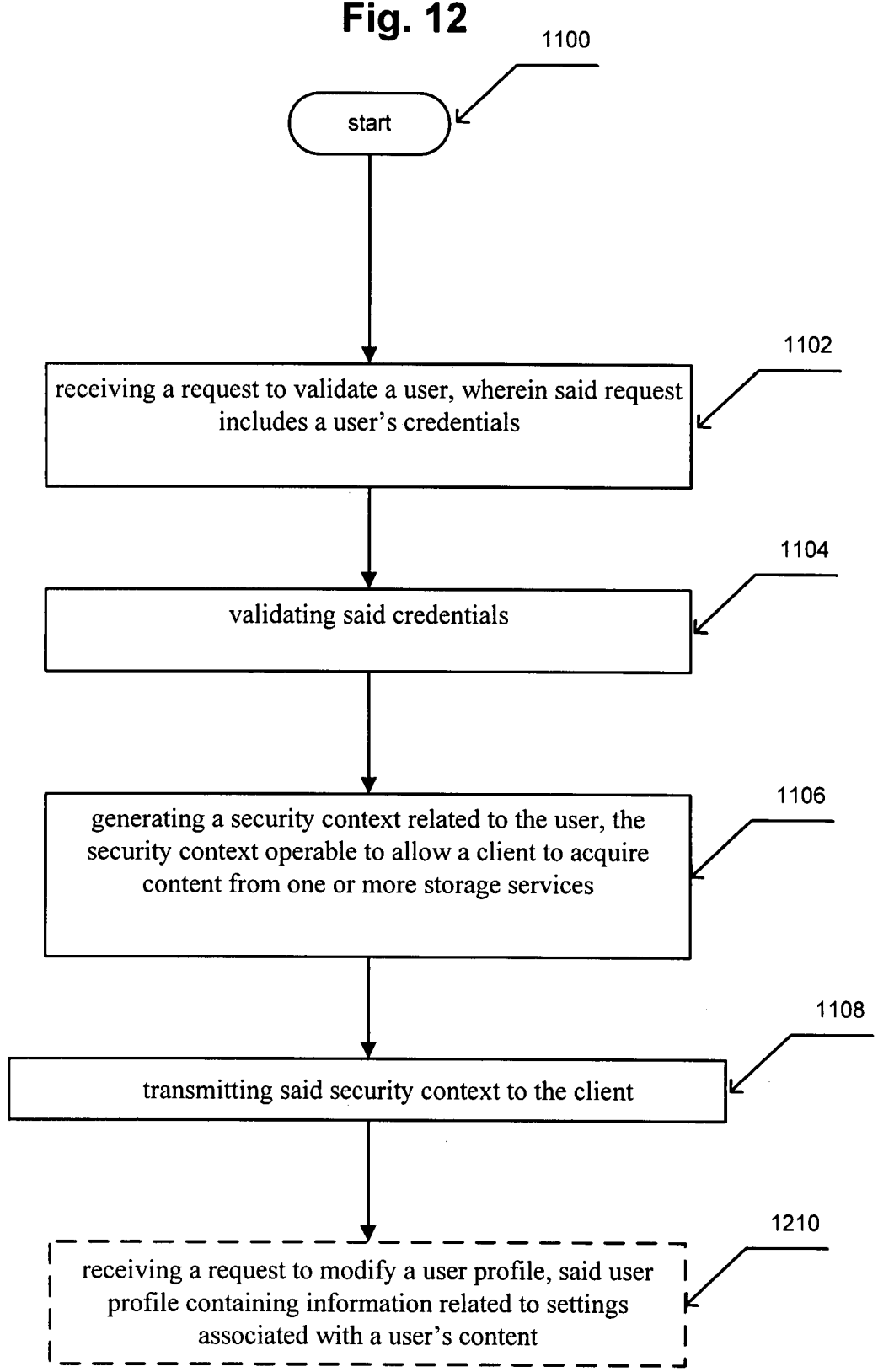

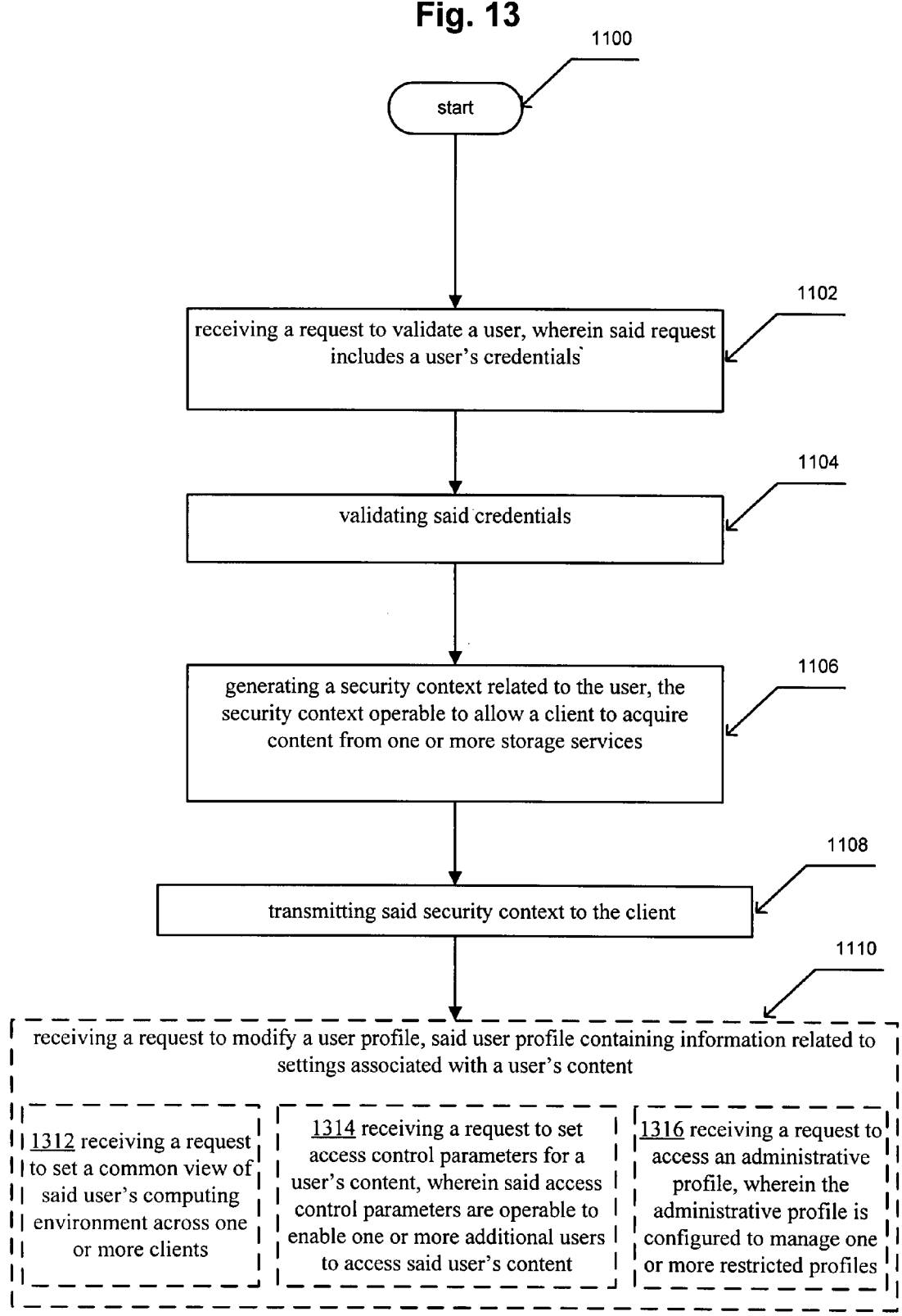

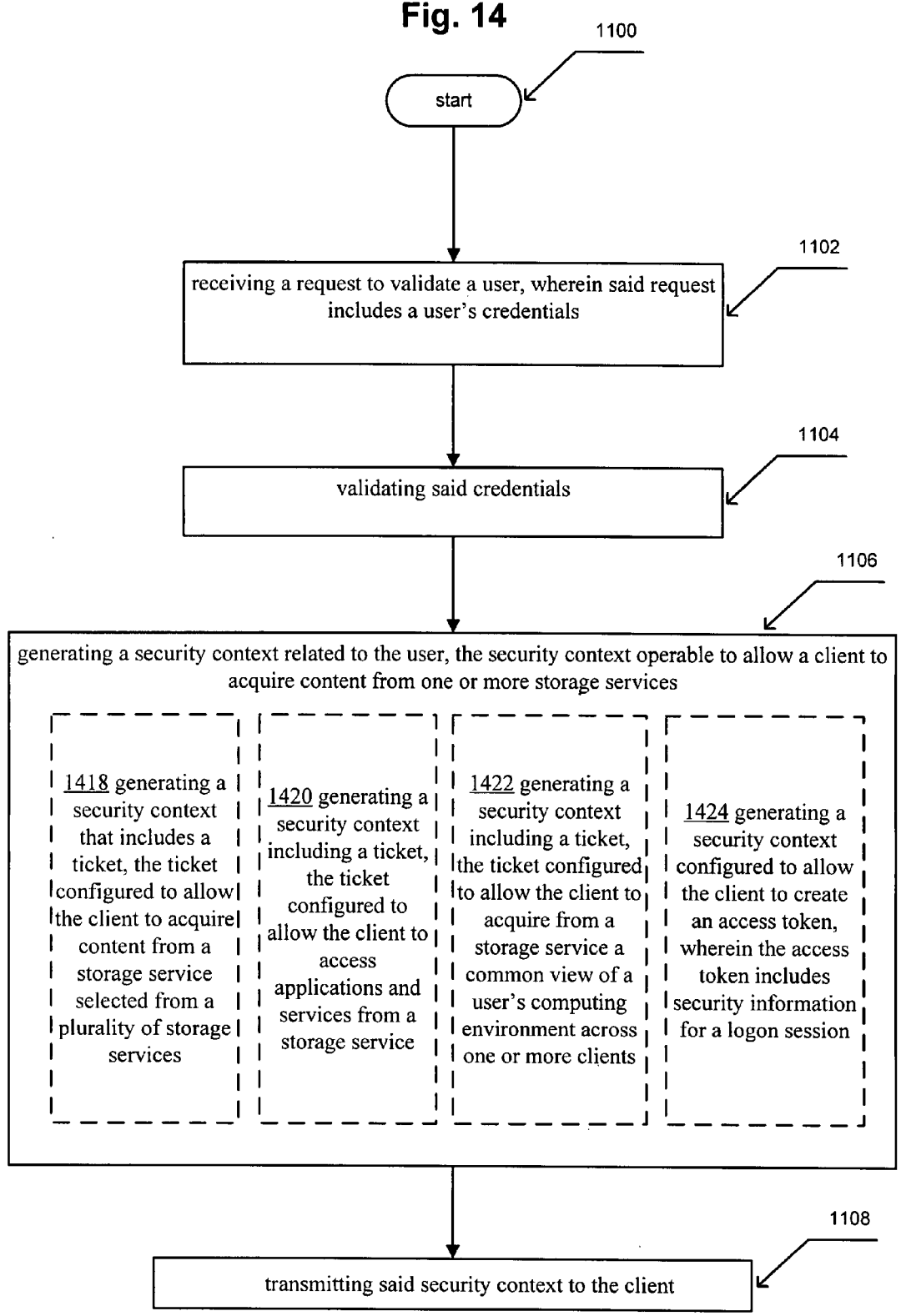

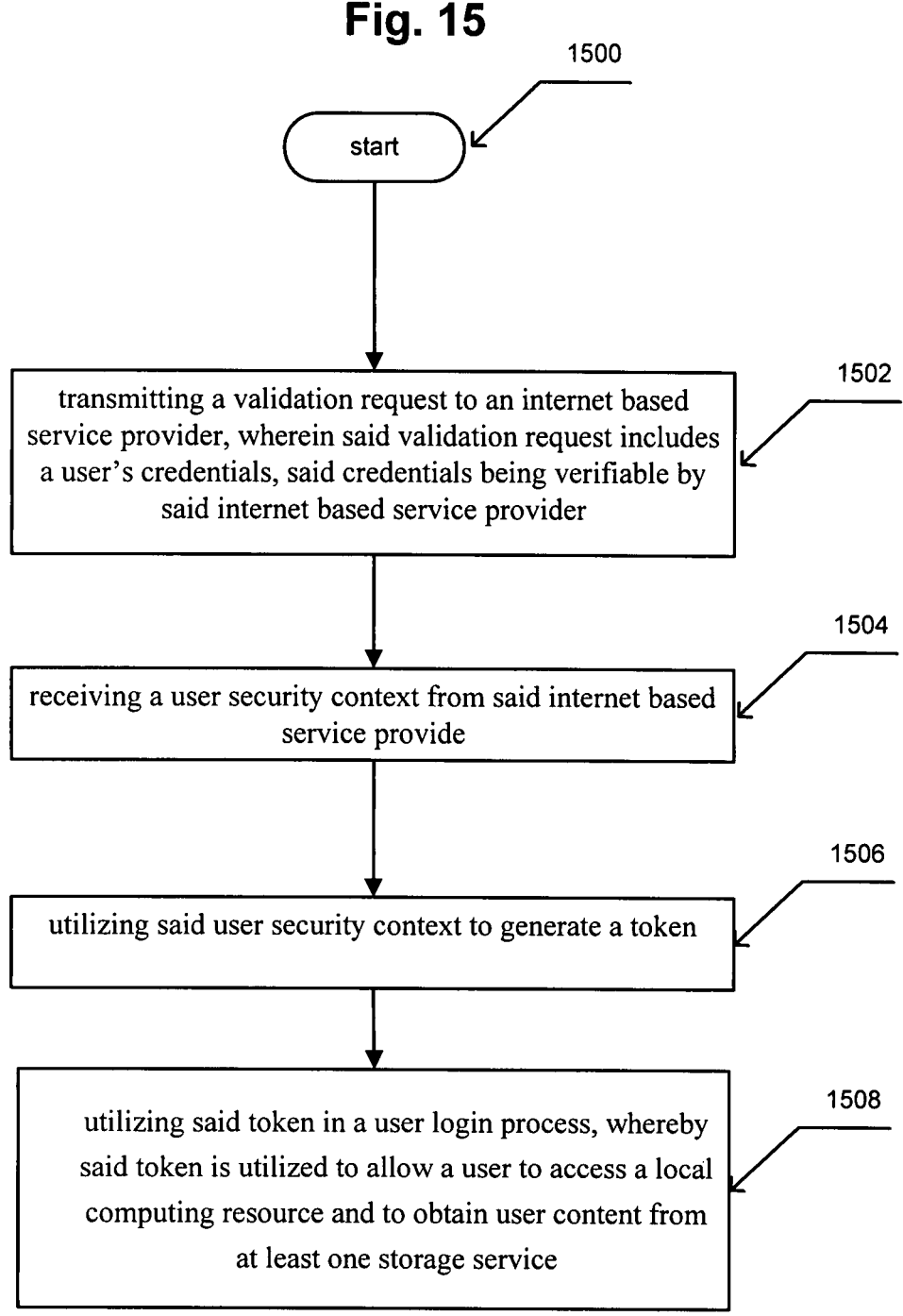

INTEGRATING OPERATING SYSTEMS WITH CONTENT OFFERED BY WEB BASED ENTITIES

BACKGROUND

The present disclosure relates to integrating computer operating systems with content offered by web based entities. A trend in the industry is to move towards a client-server architecture where the operating system has a relegated role in a user's computing experience. While the vision of a computer running a thin operating system and relying on software services managed by a service provider is compelling, the reality is that a user may have a frustrating computing experience if all possible tasks are performed through a browser, or third party emulation software.

There is a need for a hybrid approach, where users may operate a computer that has a familiar user interface that is adopted by a large and diverse user base and continue to benefit from having access to web based services and applications. In such a hybrid computing environment users may continue to use local storage, install software locally, and utilize services stored and maintained by web based entities without having to open up a web browser and sign into multiple service providers. This hybrid approach may be realized by integrating the logon process of a computer with internet based services in order to give a user seamless access to their locally installed software and services that are maintained by internet based service providers.

The computing environments of today require a user to go through multiple steps in order to access online content. These steps must be performed after the user logs in and require the user to take the time to familiarize themselves with the layout of any desktop they try to access files from. A user can configure their own computer to separately log into all of their internet based services, but this occurs after the user has logged into the operating system and the system has loaded. Additionally, when a user is working with their home computer, outside of the enterprise context, this configuration can not be transferred to another computer making it necessary to either take their own laptop when traveling, or suffer through an impoverished computing experience. It's true that when traveling you can either access a completely virtualized environment through a VPN which is slow and operates within a partition, or sign into the individual services you want (which may require some configuration of the local device), but instantaneous access to the full range of services while preserving the speed and convenience of a local computing experience is not possible.

SUMMARY

Example embodiments are provided for integrating operating systems with content offered by internet based entities. In one implementation, a method includes but is not limited to a computer system that can transmit a logon request to an internet based service provider. The internet based service provider can be configured to validate the user's credentials and send the user back a security context. Once the user's computer system receives the security context the operating system of the user's computer may translate the security context into a token that the computer system's operating system can use as part of a logon session. This token can be additionally used by the operating system to check whether a user has permission to access content such as documents, movies, or instant messenger programs. If the user has permission for such content the operating system may send a request to one or more storage services that host the content and download the content, or a link to the content so that the user can access services from one or more service providers without having to open a web browser and sign into each provider's website.

It can be appreciated by one of skill in the art that one or more various aspects of the invention may include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. In addition to the foregoing, other system aspects are described in the claims, drawings, and text forming a part of the present application.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

FIG. 11 illustrates an operational flow representing example operations related to techniques for validating user credentials.

FIG. 12 illustrates an alternative embodiment of the example operational flow of FIG. 11.

FIG. 13 illustrates an alternative embodiment of the example operational flow of FIG. 11.

FIG. 14 illustrates an alternative embodiment of the example operational flow of FIG. 11.

FIG. 15 illustrates an operational flow representing example operations related to techniques facilitating a computer logon session.

DETAILED DESCRIPTION

Figure 1:
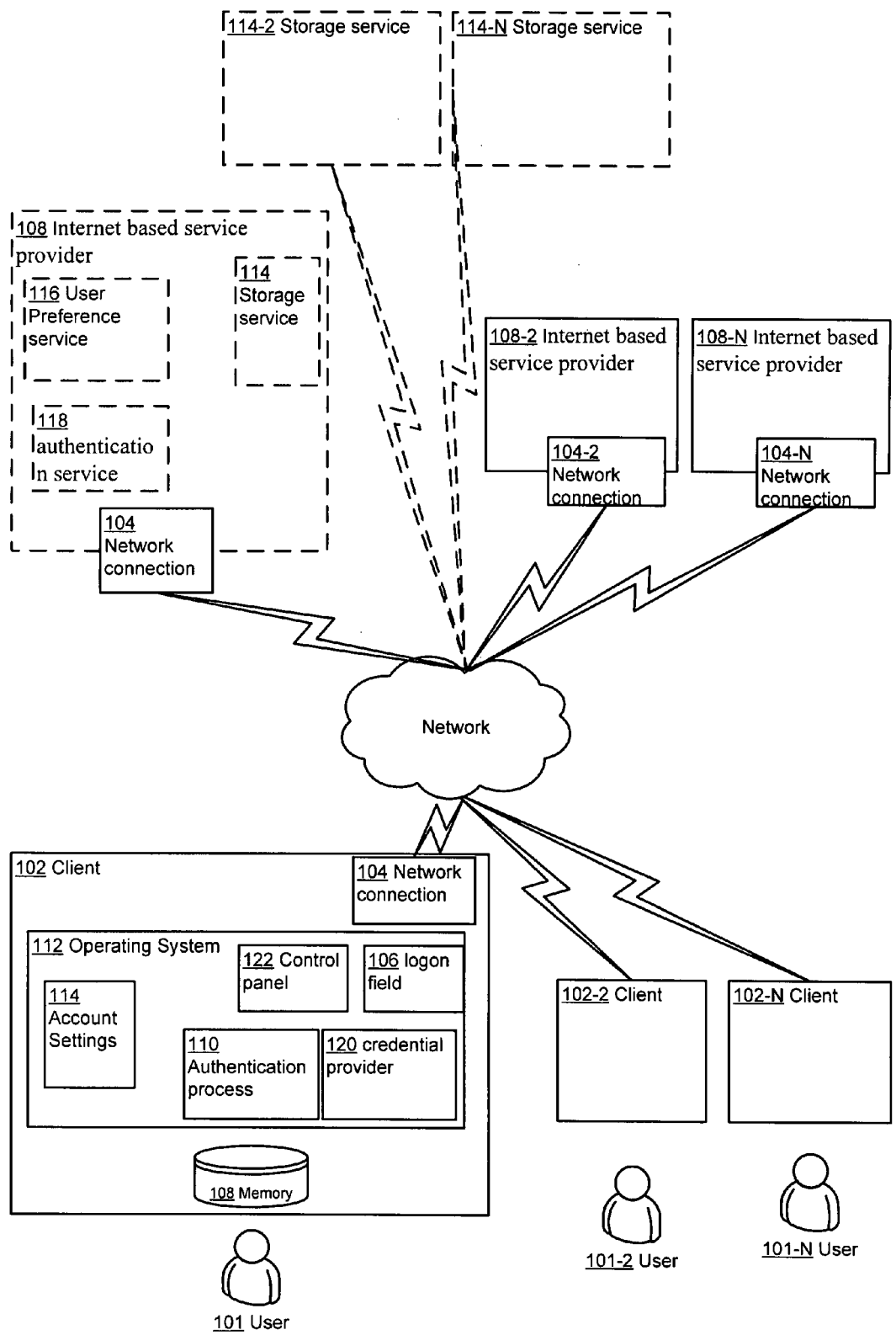
FIG. 1 illustrates an example system wherein techniques for facilitating a computer logon session may be implemented.

FIG. 1 illustrates an example system where the herein-described operations may be implemented. FIG. 1 includes one or more clients 102, through 102-N (where N is an integer greater than 1) wherein each client 102 may have an associated user 101 through 101-N. The client 102 may be a desktop computer, laptop computer, PDA, or any type of computing environment. Each client 102 may contain a network connection 104 such as an Ethernet port, 802.11 adaptor, Wi-Fi adaptor, telephone port, or any other type of circuitry that enables a computer to communicate with another system, memory 108 such as a hard drive, RAM, or any other storage medium, and an operating system 112. The operating system 112 may include but is not limited to software procedures to create a control panel 122 e.g., a software system tool accessible from a command prompt or from a GUI, a logon field 106, account settings 114, an authentication process 110, and a credential provider 120.

Each client 102 may be connected to the network connection 104 through 104-N of one or more internet based service providers 108 through 108-N. An internet based service provider 108 may be, for example, a publicly accessible web entity, such as Google®, MSN®, Amazon.com®, nytimes.com®, Yahoo!®, or any web portal that maintains a database of user accounts. The one or more internet based service providers 108 through 108-N may optionally include an authentication service 118, a user preference service 116, and/or a file storage service 114.

Figure 2:
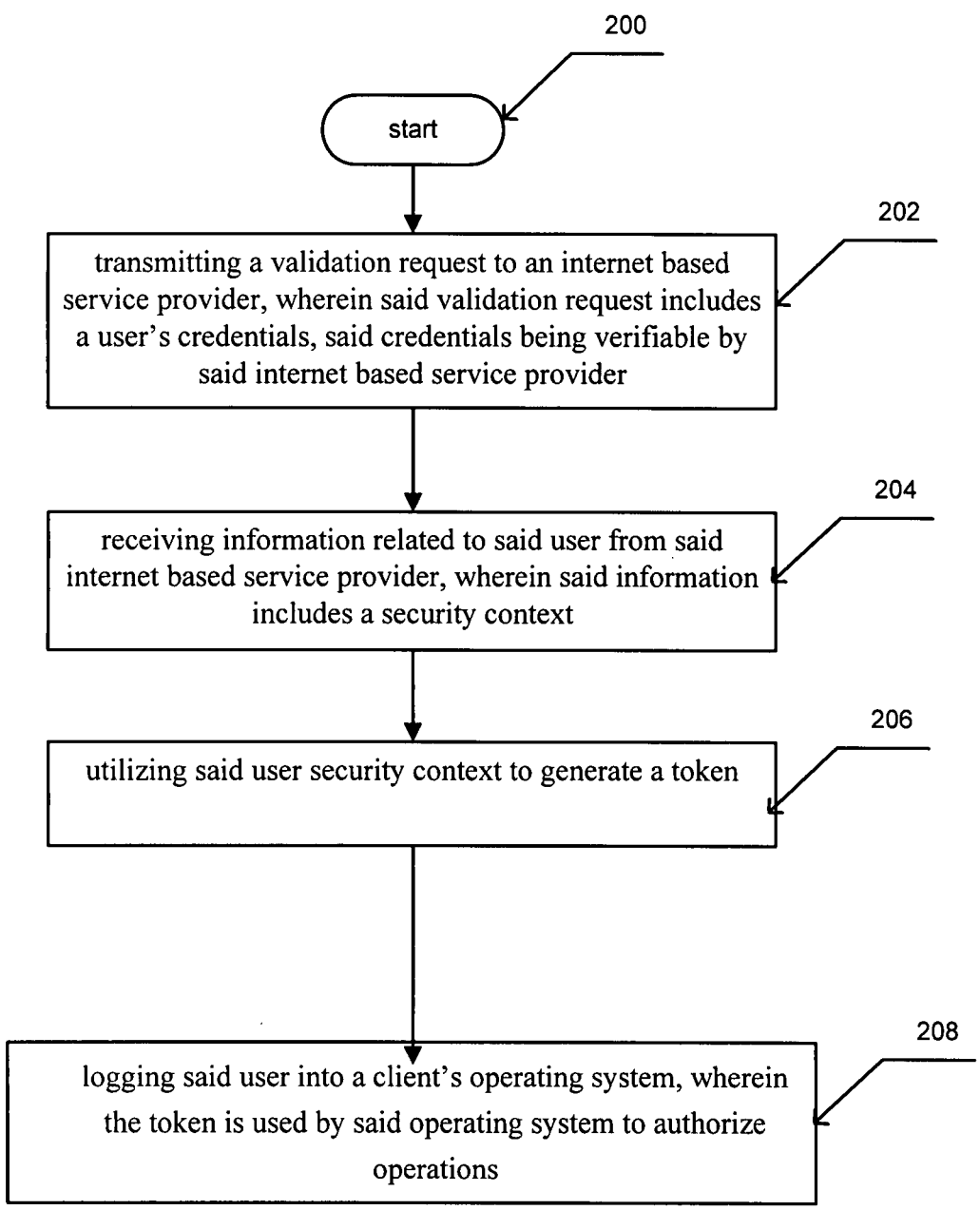
FIG. 2 illustrates an operational flow representing example operations related to facilitating a computer logon session.

FIG. 2 illustrates the operational flow 200 representing example operations relating to logging into a computer system's operating system that optionally may include one or more of the operations 202, 204, 206, and 208. Those skilled in the art will note that operations 202-208 are illustrative in purpose and that different implementations can typically employ one or more of the herein-described operations dependent upon context, and the selection of the appropriate operation(s) appropriate to the various context(s).

Operation 200 illustrates the start of the operational process. Operation 202 illustrates transmitting a validation request to an internet based service provider, wherein said validation request includes a user's credentials, said credentials being verifiable by said internet based service provider. For example, a client 102, that includes a network connection 104 may transmit a request to be validated to an internet based service provider 108. The request may be generated by an operating system 112 of the client 102. The operating system 112 may generate such a request after receiving a user's credentials via a rendered logon field 106. The required credentials may be specified by a credential provider 120 based on the type of authentication package the computer system uses to validate users. A more specific example may include a client 102, e.g., desktop computer, laptop computer, PDA, or any type of computing environment with an operating system, that transmits one or more packets of information indicative of a validation request over a network Ethernet connection to an internet based service provider, e.g., a web presence including at least a database of user accounts. The personal computer may have sent such a request after an authentication package, e.g., a software package that implements an authentication protocol that is used to authenticate the user credentials was selected. The personal computer may then send one or more packets to the internet based service provider, e.g., a publicly accessible web entity, such as Google®, MSN®, Amazon.com®, The Newyorktimes.com®, Yahoo!®, or any web portal that maintains a database of user accounts. The one or more packets may include the logon information, e.g., the username and password of the user 101 such as Bob@webentity.com and Bob's password and the authentication package the computer uses to authenticate users.

Operation 204 illustrates receiving information related to said user from said internet based service provider, wherein said information includes a security context. For example and in addition to the previous example, a client 102 may receive over a network connection 104 data from the specific internet based service provider 108 associated with a user's credentials, the data including data about the user 101. A more specific example may include a computer system that receives over it's wireless network connection one or more packets indicative of information that includes a security context, e.g., a data structure that has security data relevant to logging into an operating system such as the user name associated with the user or anything that can identify the user while they are logged into the computer system.

Operation 206 illustrates utilizing said user security context to generate a token. For example and in addition to the previous example, an authenticating process 110 of operating system 112 may verify the data about the user 101 to determine whether the user 101 has permission to logon to the computer system locally either by being authorized directly, or by being a member of an authorized group and generating a token, e.g., an object that contains information know about the user 101. More specifically, an authenticating subsystem, for example, the security authority of an operating system may verify the user information in the data structure and generate a token that includes information about the user.

Operation 208 illustrates logging said user into a client's operating system, wherein the token is used by said operating system to authorize operations. For example and in addition to the previous example, the authentication process 110 of operating system 112 may create a logon session for the user 101. Additionally, the operating system 112 may use the token to identify the user 101 for authentication purposes if the user 101 tries to interact with the client 102 or tries to perform tasks on the client 102. More specifically, security authority of operating system may create a logon session or a kernel session for the user 101. The operating system may use the token to check whether a user 101 can access system resources or access objects in the computer system.

FIG. 3 through FIG. 10 provide additional embodiments of the operation 200 one skilled in the art will recognize that the operational steps illustrated in FIG. 3 through FIG. 10 are examples and other embodiments exist. Those skilled in the art will note that some operations in FIG. 3 through FIG. 10 are indicated by dashed lines, which, in general, indicates that they are to be considered optional and this is generally true throughout this disclosure with respect to described operations. More specifically, different implementations will typically employ one or more herein-described operations dependent upon context, and the selection of the appropriate operation(s) appropriate to the various context(s) is within the skill of one in the art in light of the teachings herein.

Figure 3:
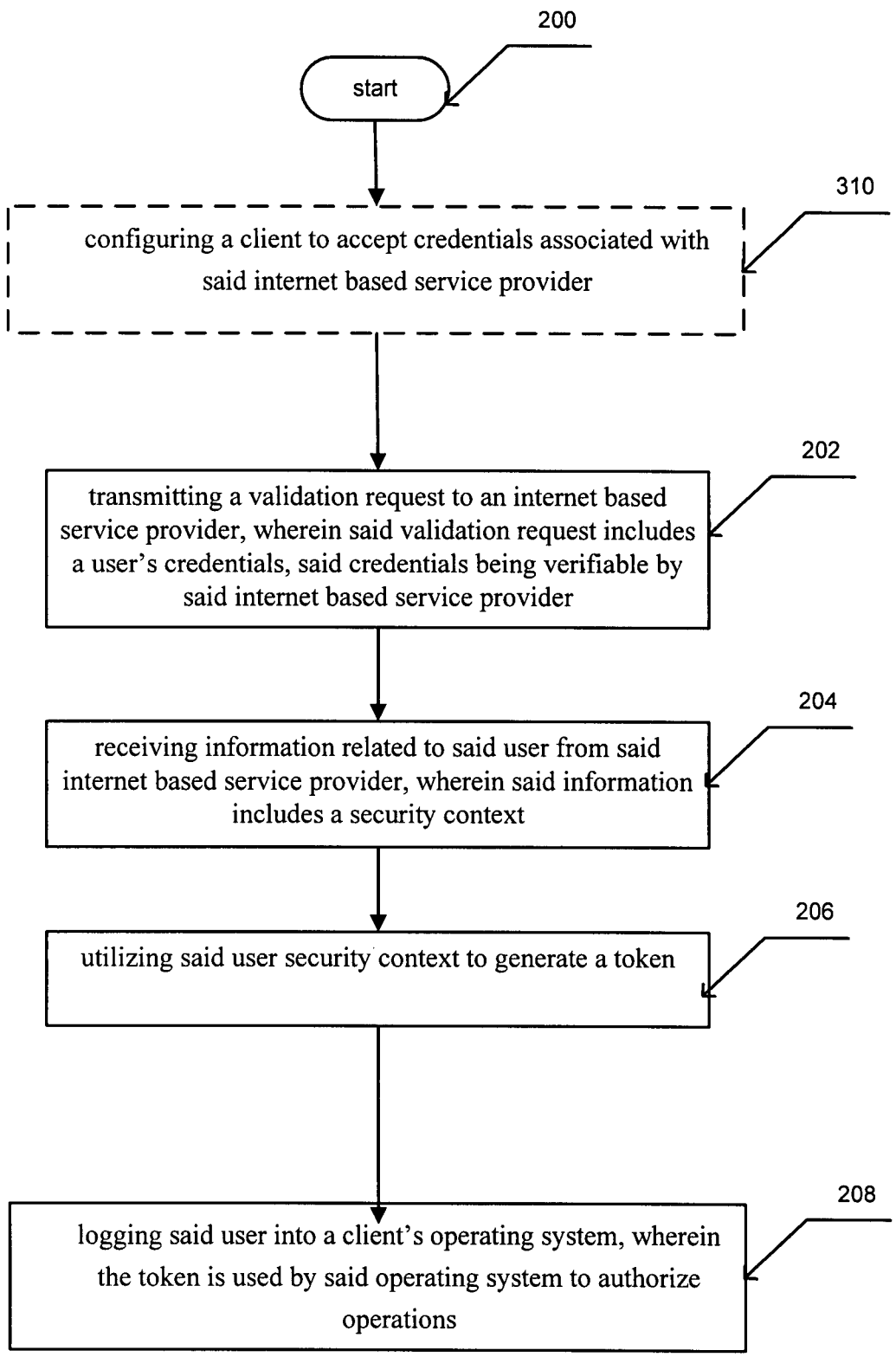
FIG. 3 illustrates an alternative embodiment of the example operational flow of FIG. 2.

FIG. 3 illustrates an alternative embodiment of the example operational flow 200 of FIG. 2. FIG. 3 illustrates an example embodiment where the operational flow 200 includes operation 310.

Operation 310 illustrates configuring a client to accept credentials associated with said internet based service provider. For example, a client 102 may be provisioned by configuring the account settings 114 of an operating system 112 to allow an internet based service provider 108 selected from one or more internet based service providers 108-N (where N is a positive integer greater than 1) to authenticate users 101 through 101-N. More specifically, a personal computer may be set up, e.g., by adding an ID associated with a web based entity to the list of acceptable user accounts during the initial OS setup when a user 101 first sets up their system, when the user 101 selects a hypertext link on a web site and downloads a setup program that start a wizard that adds a user account, or by entering the operating system's control panel and adding a user account manually. Another specific example includes, adding a username such as "Bob" and the domain that manages the account associated with the username such as "webportal.com" to the list of accounts that can logon to the computer system, or an alternative example may include just a user 101 adding the domain "webportal.com" to the list of domains that can logon to the computer system.

Figure 4:
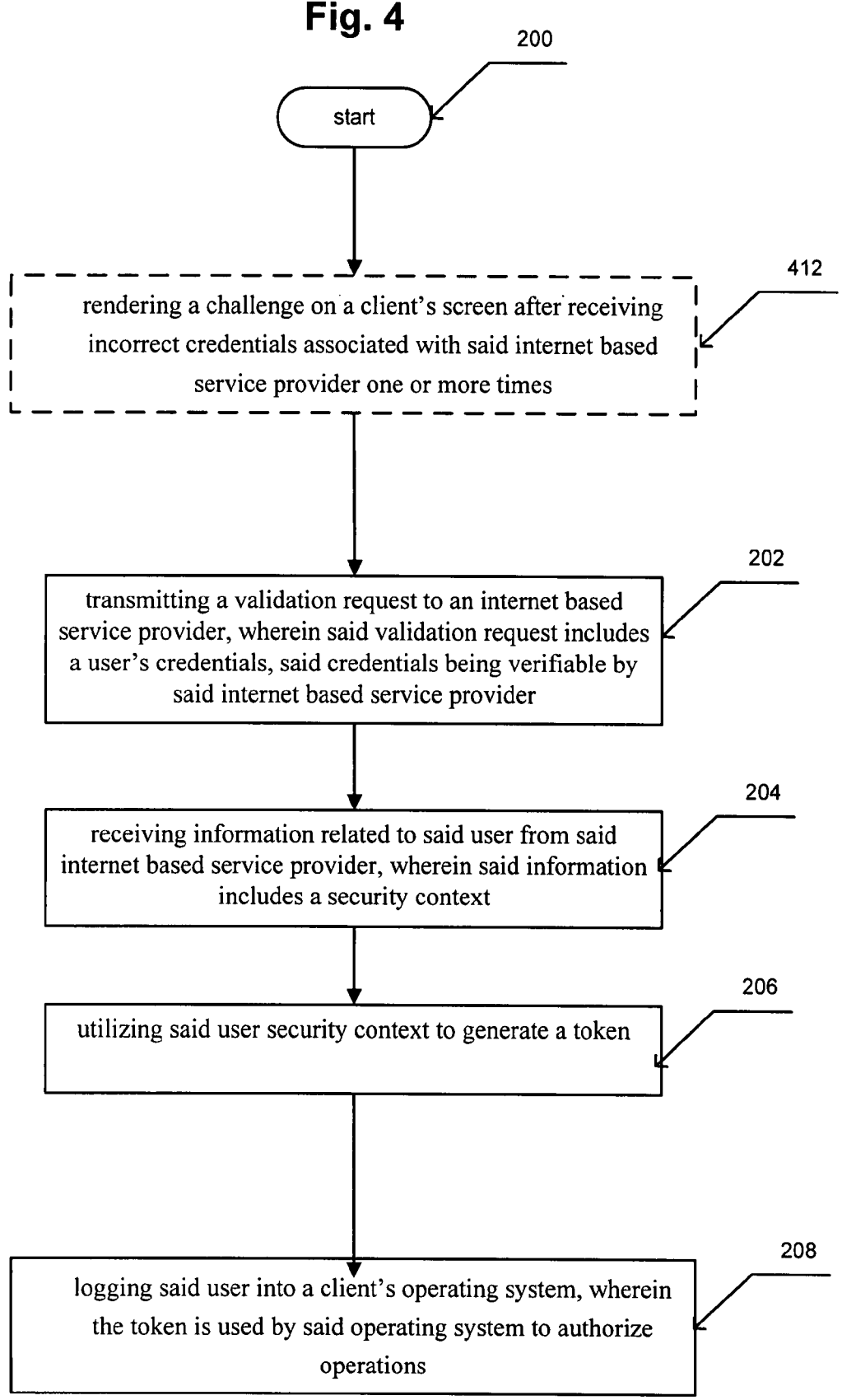
FIG. 4 illustrates an alternative embodiment of the example operational flow of FIG. 2.

FIG. 4 illustrates an alternative embodiment of the example operational flow 200 of FIG. 2. FIG. 4 illustrates an example embodiment where the operational flow 200 includes operation 412.

Operation 412 illustrates rendering a challenge on a client's screen after receiving incorrect credentials associated with said internet based service provider one or more times. For example, an operating system 112 of client 102 may render a challenge, e.g., a question that the user must answer in order to unlock the authentication process 110 after the logon field 106 receives incorrect credentials one or more times. More specifically, the operating system may display a challenge, e.g., a captcha challenge, a request to answer a personal question such as "what is your city of birth?", or any other type of challenge on the computer screen after the operating system receives an incorrect username/password combination a predetermined number of times.

Figure 5:
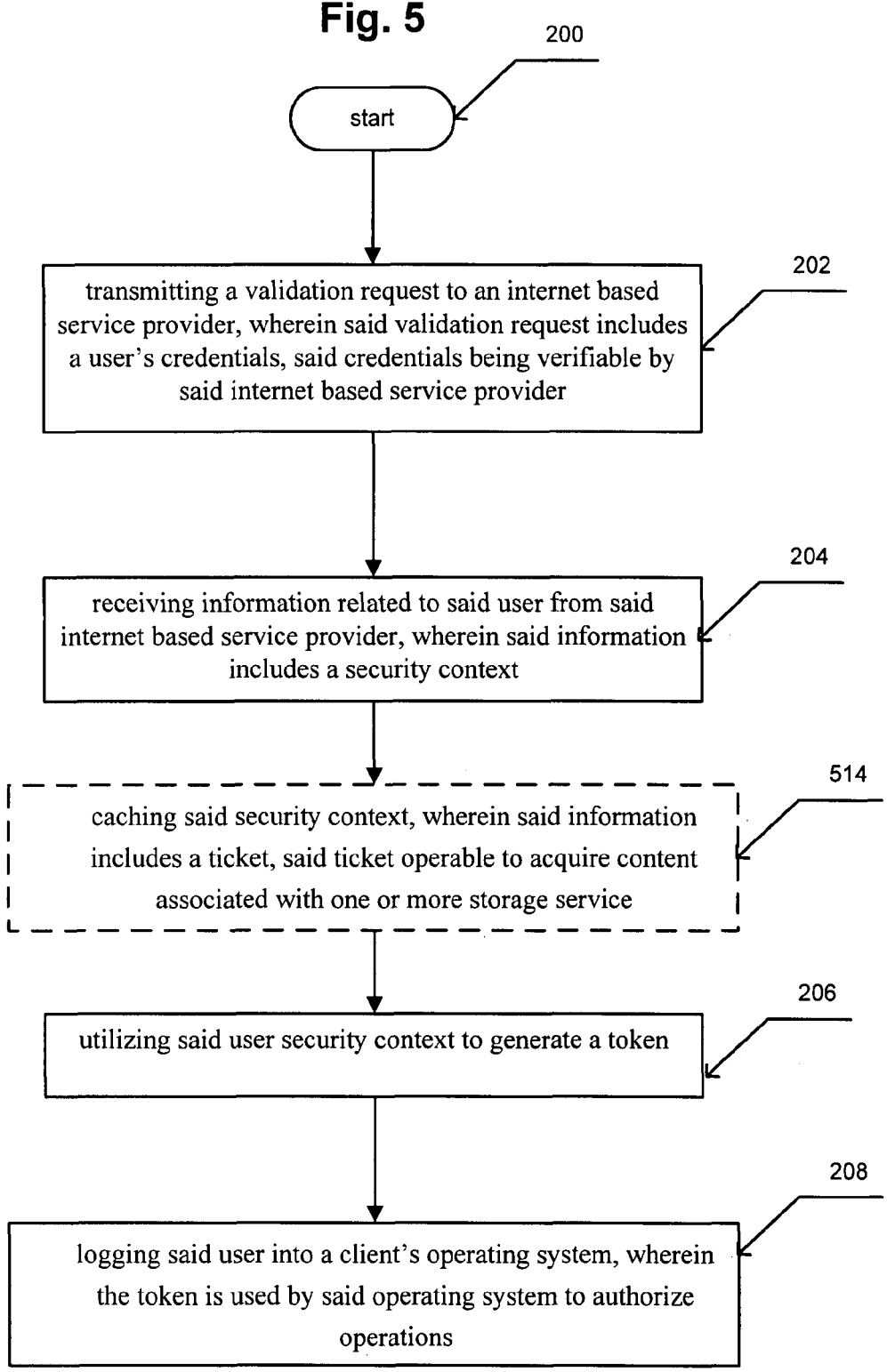
FIG. 5 illustrates an alternative embodiment of the example operational flow of FIG. 2.

FIG. 5 illustrates an alternative embodiment of the example operational flow 200 of FIG. 2. FIG. 5 illustrates an example embodiment where the operational flow 200 includes operation 514.

Operation 514 illustrates caching said security context, wherein said information includes a ticket, said ticket operable to acquire content associated with one or more storage services. For example, memory 108 of client 102 may store a security context, wherein the security context includes a ticket that can be used by the user 101 or the operating system 112 to acquire content, e.g., movies, videos, pictures, bookmarks or internet favorites, files, operating system preferences, applications, services, or any other type of content. The ticket may then be utilized by the client 102 to acquire content from one or more storage services 114 through 114-N (wherein the storage services may optionally be part of the internet based service provider 108, or separate servers connected to the internet based service provider via a network such as the internet) associated with a specific internet based service provider 108 selected from a group of internet based service provider 108-N. More specifically, memory, e.g., a hard drive, random access memory, EEPROM, or a recordable medium such as a cd-rom, may store data about the user 101 wherein the data includes a ticket granting ticket. The ticket granting ticket may be operable to allow a personal computer to acquire other tickets for files stored on one or more websites without the user 101 having to sign in to each website. Another specific example may include receiving the contents of a file such as "My Documents" where the contents of "My documents" are stored in a file hosting website maintained by the web based entity that validated the user's credentials. When the user attempts to open the folder on their desktop, a copy of the ticket granting ticket cached in the user's computer may be presented to the web based entity for verification. The entity may issue the client 102 a ticket that can be presented to the file hosting website for the contents of "My documents." Thus, in this example, after the client 102 transmits the ticket to the file hosting website, the contents of "My documents" may be transmitted to the user 101 and rendered in the folder stored on their desktop.

Figure 6:
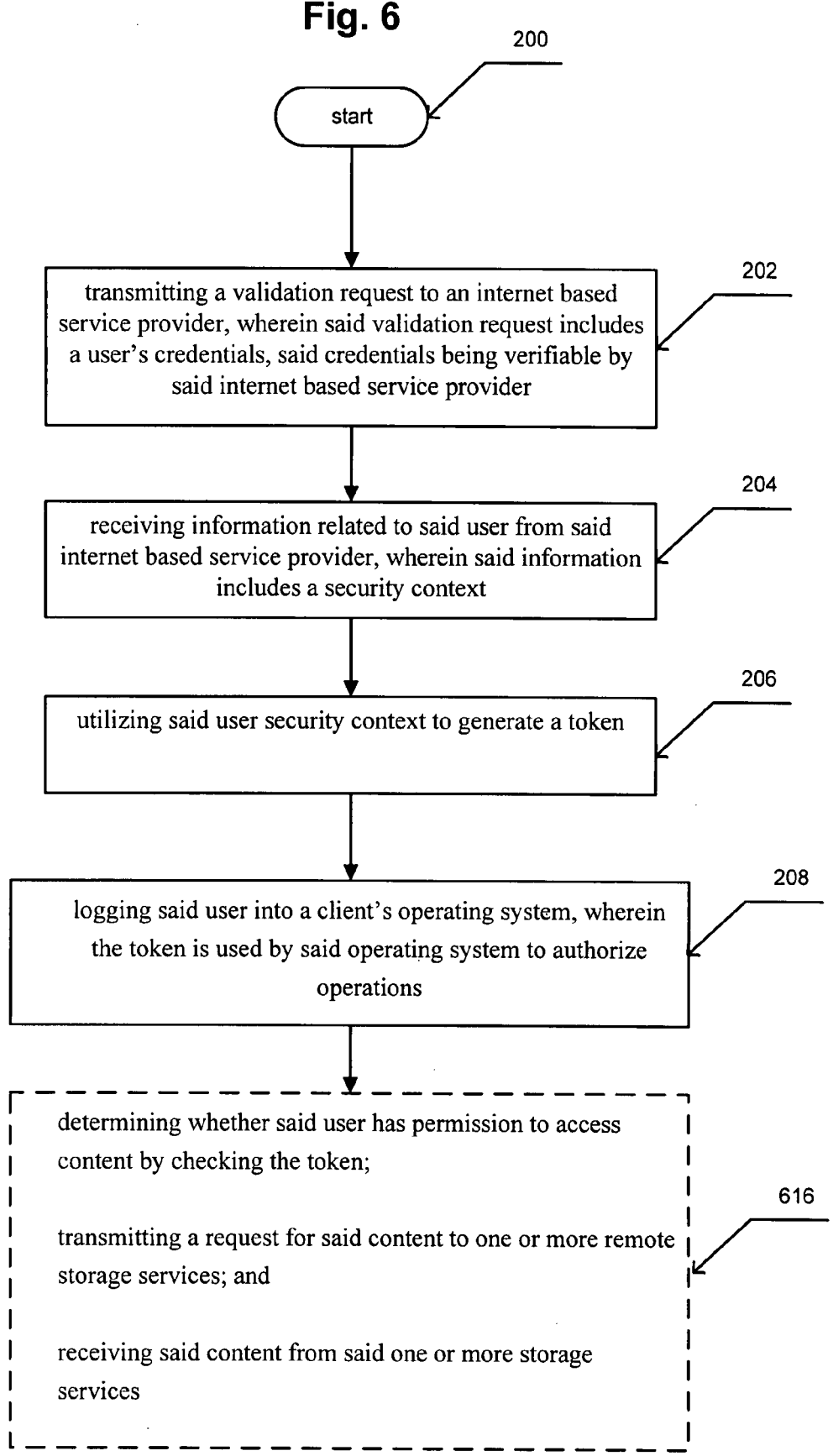
FIG. 6 illustrates an alternative embodiment of the example operational flow of FIG. 2.

FIG. 6 illustrates an alternative embodiment of the example operational flow 200 of FIG. 2. FIG. 6 illustrates an example embodiment where the operational flow 200 includes operation 616.

Operation 616 illustrates determining whether said user has permission to access content by checking the token; transmitting a request for said content to one or more remote storage services; and receiving said content from said one or more storage services. For example, operating system 112 of client 102 may check the access rights of the user 101 that are stored in the token to determine whether the user 101 has the right to access the requested content. The client 102 may then transmit a request for the content to the proper storage service 114 through 114-N, e.g., the web presence that has the content and then receive the requested content. A more specific example may include, an operating system that checks an access token to determine whether the user 101 may access a file system stored in an online file storage database. The computer system may transmit a request to the online file storage database. The request may include a ticket granting ticket (in the instance that a web portal includes the content), or the request may include a ticket for the specific content (in the instances that a ticket was acquired after presenting the user's credentials and the ticket granting ticket to a web presence). Subsequently the computer system may receive access to the file system. An even more specific example may include the user 101 initiating the logon process and the operating system then checking the generated token to see whether the user 101 has read/write privileges for a file, such as a spreadsheet stored on a website. If the user 101 has read or write privileges the wireless network connection of the computer may send a request for the spreadsheet to the website. The request may include a ticket showing that the user 101 is authorized to receive the spreadsheet. After the user 101 is validated, the computer system may receive the spreadsheet, or generate a link to the spreadsheet and place an icon for the spreadsheet on the user's desktop. Thus, in certain example embodiments, by the time the logon process ends, an icon to the spreadsheet has been placed on the computer for the user to quickly access the spreadsheet.

Figure 7:
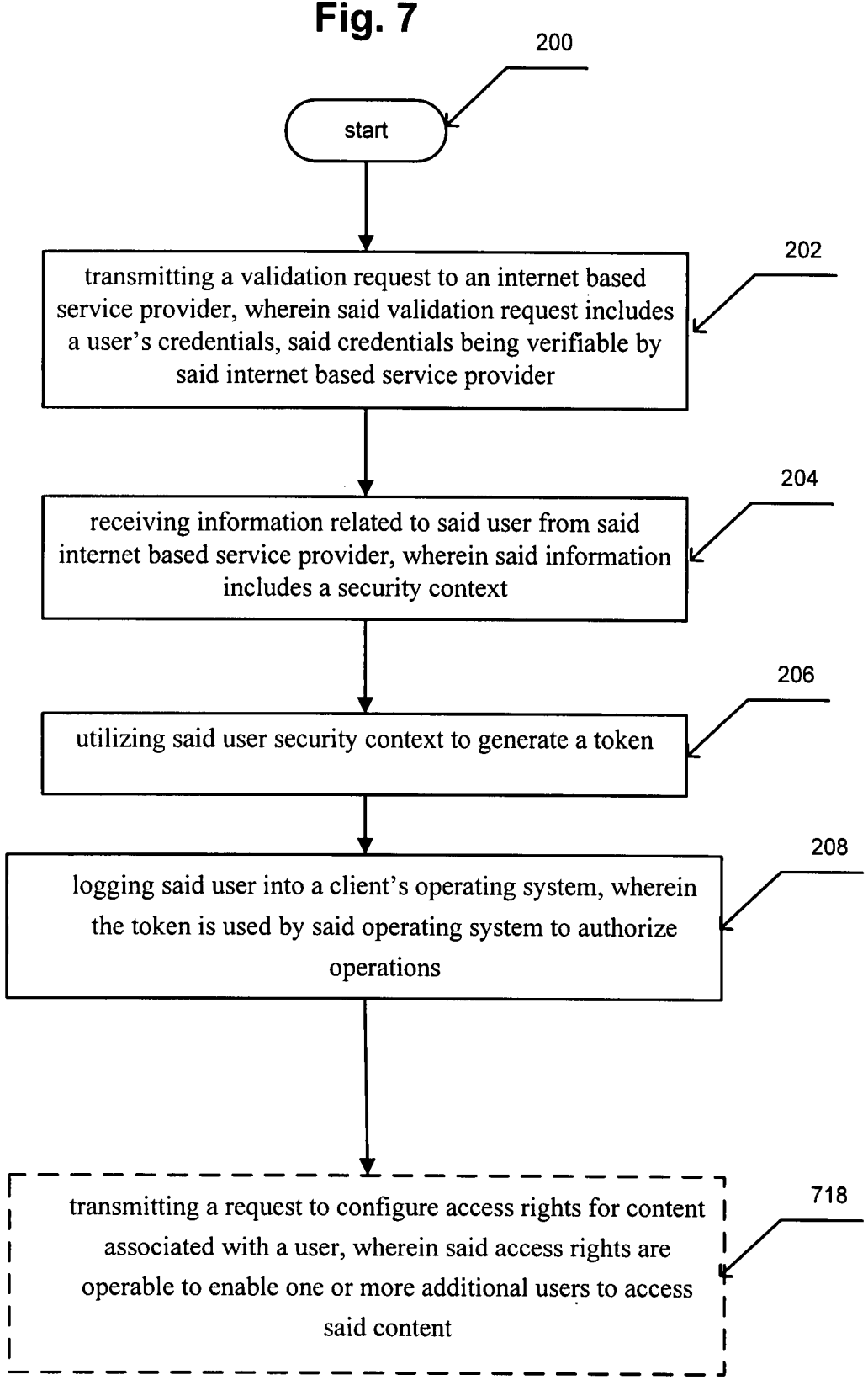
FIG. 7 illustrates an alternative embodiment of the example operational flow of FIG. 2.

FIG. 7 illustrates an alternative embodiment of the example operational flow 200 of FIG. 2. FIG. 7 illustrates an example embodiment where the operational flow 200 includes operation 718.

Operation 718 illustrates transmitting a request to configure access rights for content associated with a user, wherein said access rights are operable to enable one or more additional users to access said content. For example, network connection 104 of client 102 transmitting one or more packets indicative of a request to change one or more access properties associated with their content to a user preference service 116 that may be optionally located within the internet based service provider, or could be connected to the internet based service provider via a network such as the internet. More specifically, an Ethernet port of a personal computer may transmit one or more packets of information to an account database management service. The packets may include a request to configure one or more access control lists associated with a user's content to enable a user 101 to configure who may access their content. A more specific example may include a user 101 opening up an interface that lists the properties of a specific folder, or the properties of the content in a specific folder. The user 101 may set the folder properties to allow other users 101-2 through 101-N to access the folder such as friends, college buddies, or entire groups of people like all the employees of an IT department.

Figure 8:
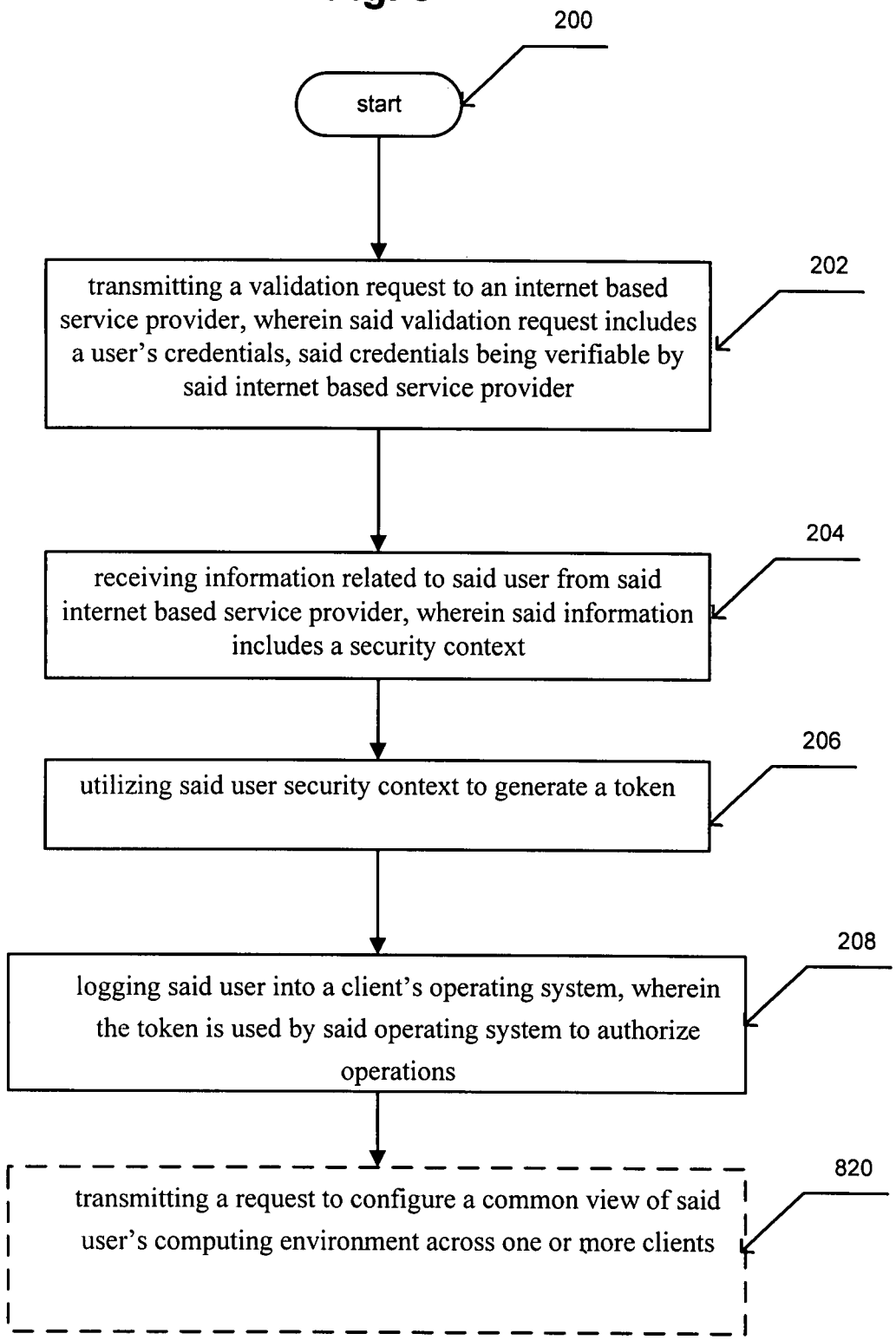
FIG. 8 illustrates an alternative embodiment of the example operational flow of FIG. 2.

FIG. 8 illustrates an alternative embodiment of the example operational flow 200 of FIG. 2. FIG. 8 illustrates an example embodiment where the operational flow 200 includes operation 820.

Operation 820 illustrates transmitting a request to configure a common view of said user's computing environment across one or more clients. For example, a network connection 104 of a client 102 may transmit one or more packets indicative of a request to set a common view of a user's computing environment across one or more computer systems to a user preference service 116. More specifically, an wireless adaptor of a personal computer may transmit one or more packets of information to an account database management service. The packets of information may include a request to configure a common view, e.g., the request may be to pick a common desktop picture, choose a common file organization scheme, select common internet favorites, etc., that can be applied to one or more computers that the user 101 logs into.

Figure 9:
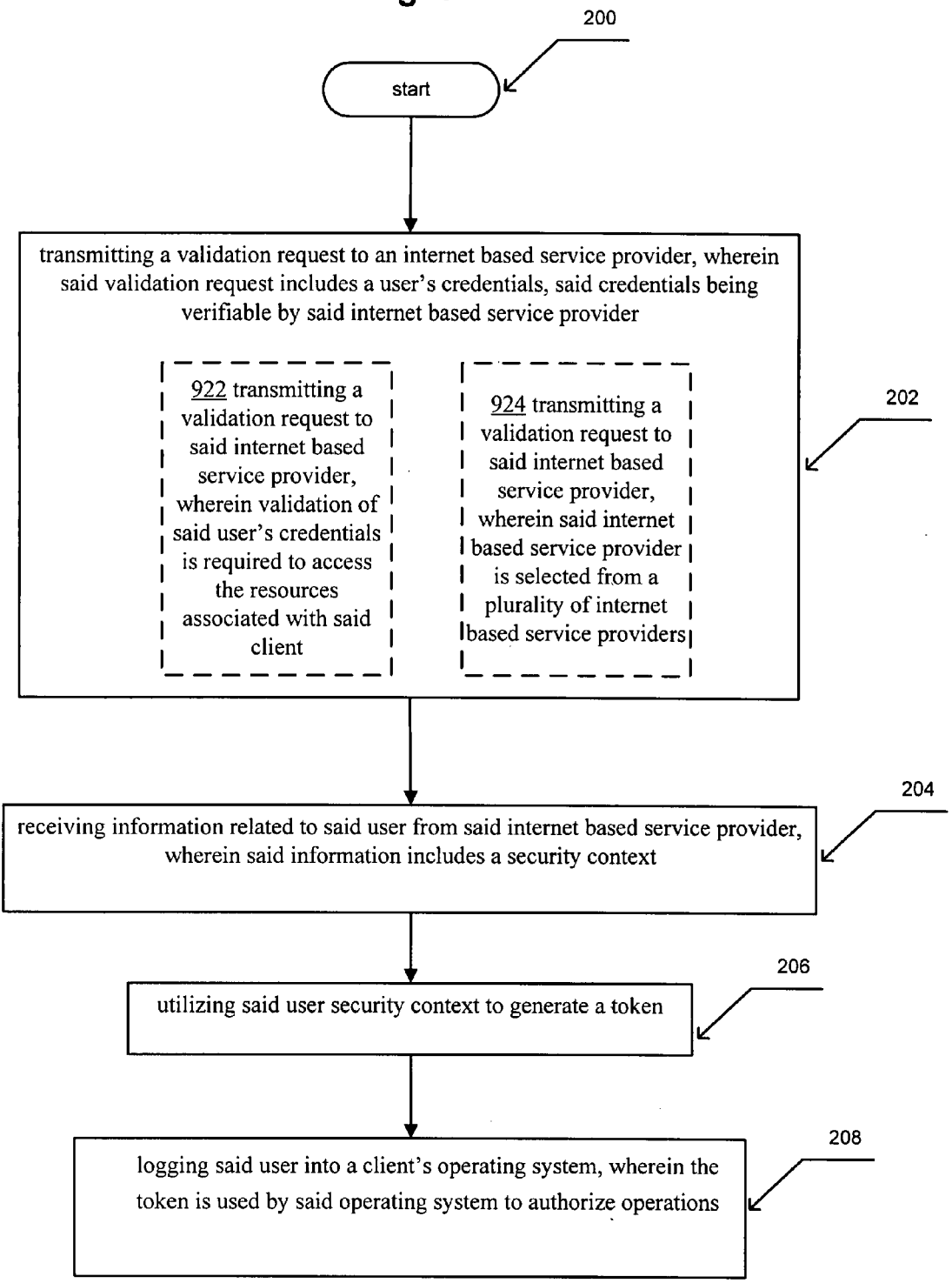
FIG. 9 illustrates an alternative embodiment of the example operational flow of FIG. 2.

FIG. 9 illustrates an alternative embodiment of the example operational flow 200 of FIG. 2. FIG. 9 illustrates an example embodiment where the operation transmitting a validation request to an internet based service provider, wherein said validation request includes a user's credentials, said credentials being verifiable by said internet based service provider includes additional operations 922, and 924.

Operation 922 illustrates transmitting a validation request to said internet based service provider, wherein validation of said user's credentials is required to access the resources associated with said client. For example, a network connection 104 of client 102 transmitting one or more packets indicative of a request to be validated to an internet based service provider before the user can access the computer's resources. More specifically, an Ethernet port of a personal computer may transmit one or more packets of information to a web portal wherein the user 101 requires validation in order to access the resources of the computer system, e.g., the user 101 must be validated in order to access the files stored in the computer system or utilize any devices attached to the computer such as a printer or copier.

Operation 924 illustrates transmitting a validation request to said internet based service provider, wherein said internet based service provider is selected from a plurality of internet based service providers. For example, network connection 104 of client 102 may transmit one or more packets indicative of a request to be validated to an internet based service provider 108 selected from a group of internet based service providers 108-1 through 108-N. The credential provider 120 may specify an authentication package to use in order to facilitate the validation request. More specifically, an Ethernet port of a personal computer may transmit one or more packets of information to a web portal, e.g., MSN®, selected from a group of web portals, e.g., MSN®, Google®, or Yahoo!®. The validation request may include the credentials and the authentication package utilized by the operating system to validate users from MSN®.

Figure 10:
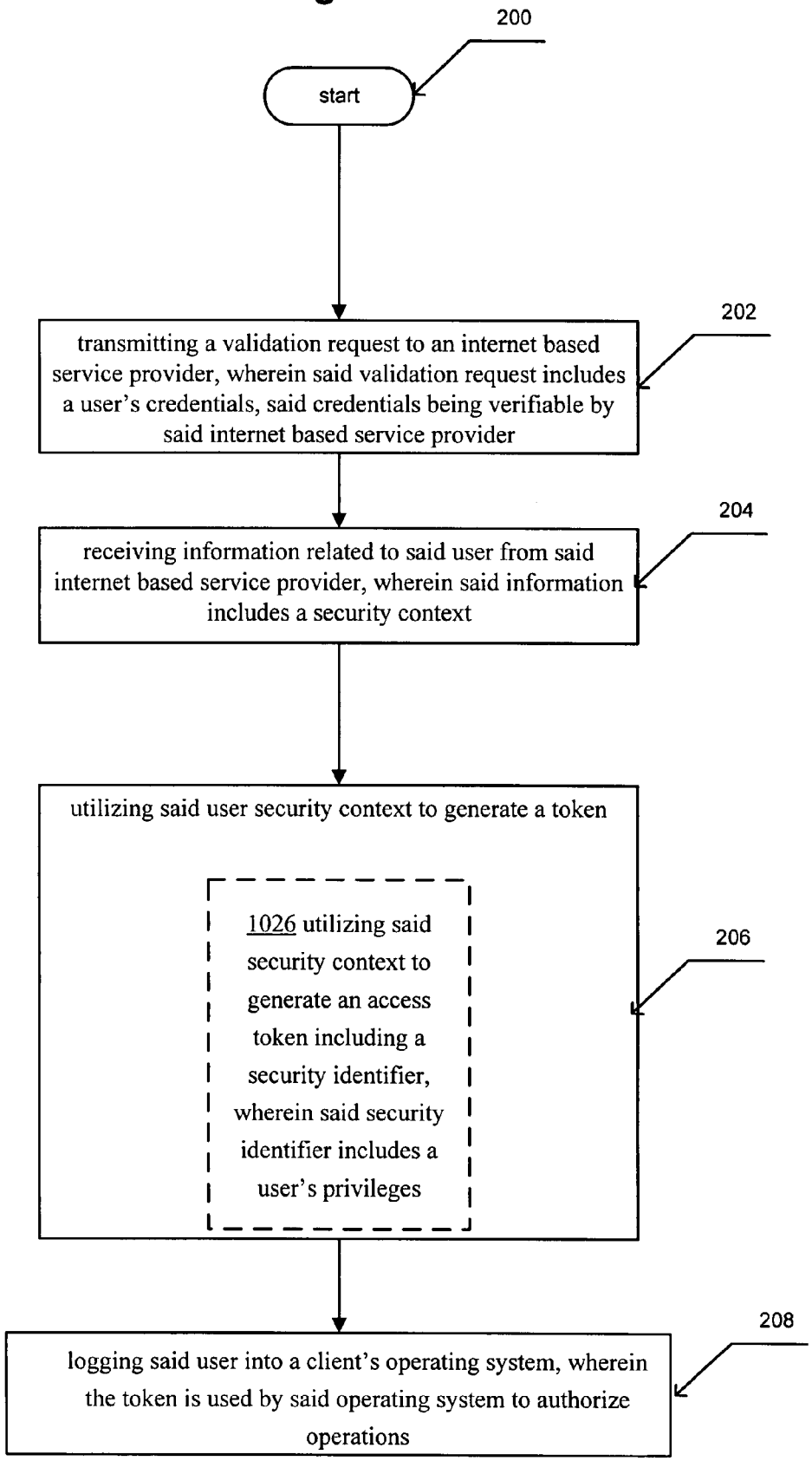
FIG. 10 illustrates an alternative embodiment of the example operational flow of FIG. 2.

FIG. 10 illustrates an alternative embodiment of the example operational flow 200 of FIG. 2. FIG. 10 illustrates an example embodiment where the operation utilizing said user security context to generate a token includes operation 1026.

Operation 1026 illustrates utilizing said security context to generate an access token including a security identifier, wherein said security identifier includes a user's privileges. For example, authentication process 110 of operating system 112 may verify that the user's security identifier has permission to logon the client 102, and the operating system may generate an access token for the session. More specifically, local security authority of, for example, a windows based operating system may check the account settings of the personal computer to determine whether the user 101 is among the list of users 101-2 through 101-N who are authorized to logon to the computer system, e.g., by checking a table of authorized users to see if a user 101 such as Bob@webportal.com has been added to the table of authorized users, or by checking to see if the domain webportal. com has been added to the table of authorized groups. In the instance that Bob is authorized, the computer system may generate an access token containing a list of the user's privileges and access control rights.

FIG. 11 illustrates the operational flow 1100 representing example operations relating to validating a user's credentials that optionally may include one or more of the operations 1102, 1104, 1106, and 1108. Those skilled in the art will note that operations 1102-1108 are illustrative in purpose and that different implementations can typically employ one or more of the herein-described operations dependent upon context, and the selection of the appropriate operation(s) appropriate to the various context(s).

Operation 1102 depicts receiving a request to validate a user, wherein said request includes a user's credentials. For example, a network connection 104 of an internet based service provider 108 may receive one or more packets of information indicative of a request to be validated from a client 102, and in some instances, the request may include a user's credentials and the type of authentication package used. More specifically, an Ethernet port of a web based entity, e.g., a web entity such as MSN®, Google®, Yahoo!®, or any other website that includes a database of user accounts may receive one or more packets of information. The request may include a request from a user 101 to logon to a computer system and in some example embodiments the request may include the type of authentication package the client 102 uses to validate user 101.

Operation 1104 depicts validating said credentials. For example, authentication service 118 of internet based service provider 108 may determine whether the user's credentials are valid. More specifically, user account service of a web portal may determine, e.g., by checking the username a password against a database of user names and passwords in order to validate the user 101.

Operation 1106 depicts generating a security context related to the user, the security context operable to allow a client to acquire content from one or more storage services. For example, authentication service 118 of internet based service provider 108 may create a data structure that includes security data relevant to acquiring content from a storage service 114. More specifically, a user account service of a web portal may create a packet of information that contains a ticket, the ticket may be used to acquire content from a content provider.

Operation 1108 depicts transmitting said security context to the client. For example, a network connection 104 of internet based service provider 108 may transmit the data structure to a client 102. More specifically, an Ethernet port of a web portal may transmit one or more packets indicative of a token to a personal computer.

FIG. 12 illustrates an alternative embodiment of the example operational flow 1100 of FIG. 11. FIG. 12 illustrates an example embodiment where the operational flow 1100 includes operation 1210.

Operation 1210 depicts receiving a request to modify a user profile, said user profile containing information related to settings associated with a user's content. For example, a network connection 104 of an internet based service provider 108 may receive a one or more packets of information from a client 102. The one or more packets may include a request from a user 101 to access a user preferences service 116 and change their account settings, or the packets may indicate that the user 101 has changed the account settings on the client 102 and the packets may be utilized to mirror changes the user 101 has made on the client 102. More specifically, a Ethernet port of web portal may receive one or more packets from a personal computer. The packets, in one embodiment, may contain a request to change what content the user 101 would like to access on one or more systems they subsequently log on to. The packets of information may in alternative embodiments indicate that the user 101 has changed what content they would like to access on one or more computers via a control panel on the computer system. A even more specific example may include a web entity such as MSN® receiving one or more packets of information that indicate that a user 101 would like to make their "My Documents" folder accessible from any computer they logon to.

FIG. 13 illustrates an alternative embodiment of the example operational flow 1100 of FIG. 12. FIG. 13 illustrates an example embodiment where the operation receiving a request to modify a user profile, said user profile containing information related to settings associated with a user's content includes additional operations 1312, 1314, and 1316.

Operation 1312 depicts receiving a request to set a common view of said user's computing environment across one or more clients. For example, some example embodiments of the operational flow 1100 may include a network connection 104 of an internet based service provider 108 that receives one or more packets from a client 102. The packets may be indicative of a request to access a user preference service 116, or alternatively the packets may be indicate that the user 101 changed their user preferences via a control panel 122 on the client 102. The user preference service 116 may be configured to set a common view of a user's computing environment across one or more clients. More specifically, an Ethernet port of a web portal may receive one or more packets of information that indicates that the user 101 has accessed their account settings from their personal computer's control panel and set a common computing environment, e.g., the user has picked a common desktop picture, has chose a common file organization scheme, or has selected common internet favorites that they want for the computers they subsequently log onto.

Operation 1314 depicts receiving a request to set access control parameters for a user's content, wherein said access control parameters are operable to enable one or more additional users to access said user's content For example a network connection 104 of internet based service provider 108 may receive one or more packets from a client 102. The packets may be indicative of a request to access a user preference service 116, or the packets may indicate that a user 101 has changed their preferences via a control panel 122 on the client 102. The user preference service 116 may be configured to allow a user 101 to grant one or more additional users 101-2 through 101-N using one or more additional clients 102-2 through 102-N the ability to access the user's content. More specifically, Ethernet port of web portal receiving one or more packets from a personal computer. The packets may be indicative of a request from a user 101 to access a to preference service, or the packets may indicate that a user has changed the access control parameters of their content via a control panel. The user preference service may allow the user to change the permission settings of their content to enable the user's friends, family, or work colleagues to access the user's files. A more specific example may include MSN® receiving a request from a user 101 to set the access parameters of their pictures. The request may specify that the user 101 would like to give his or her parents the ability to access some pictures and would like to deny his or her work colleagues the ability to access the pictures.

Operation 1316 depicts receiving a request to access an administrative profile, wherein the administrative profile is configured to manage one or more restricted profiles. For example, a network connection 104 of internet based service provider 108 may receive one or more packets from a client 102. The packets may be indicative of a request from a user 101 to access a user preference service 116, or the packets may indicate that a user 101 has accessed the user preference service 116 from the control panel 122 located in the client 102. The user preference service 116 may be configured to allow an administrator, e.g., a super user, or a user that has control over a group of user accounts to manage one or more restricted profiles. More specifically, an Ethernet port of web portal may receive one or more packets from a personal computer. The packets may be indicative of a request from an administrator to restrict some activity a restricted user can perform, for example, limiting what programs restricted users can install or what settings the restricted user can modify. In one example embodiment, a web entity such as MSN® may receive a request from a mother's personal computer. The mother may be the "admin" for her family and she may want to set what internet sites her children (the restricted users) can visit on their personal computers.

FIG. 14 illustrates an alternative embodiment of the example operational flow 1100 of FIG. 11. FIG. 14 illustrates an example embodiment where the operation generating a security context related to the user, the security context operable to allow a client to acquire content from one or more storage services includes the operations 1418, 1420, 1422, and 1424.

Operation 1418 depicts generating a security context that includes a ticket, the ticket configured to allow the client to acquire content from a storage service selected from a plurality of storage services. For example, an authentication service 118 of internet based service provider 108 may create a ticket. The ticket may be operable to allow a client 102 to acquire additional tickets for content located at storage services 114 through 114-N. More specifically, a user account service of web portal may issue a ticket granting ticket that may be used by a user's computer to acquire tickets for content such as movies, videos, files, and or pictures located one or more websites such as Yahoo!®, Google®, MSN®, and the like. Another example may include a user account service of MSN® that creates a ticket granting ticket for a personal computer. The ticket granting ticket may be used by the personal computer to acquire tickets that may subsequently be presented to an affiliated website such as Yahoo!®, or Google®, to obtain files stored on their websites.

Operation 1420 depicts generating a security context including a ticket, the ticket configured to allow the client to access applications and services from a storage service For example, authentication service 118 of internet based service provider 108 creating a ticket. The ticket operable to allow a client 102 to acquire tickets to access programs hosted by a storage service 114. More specifically, user account service of web portal issuing a ticket granting ticket that may be presented to an application hosting website to obtain applications such as web applications, e.g., thin clients, or applications such as word processors, spreadsheets, and/or videogames from the application hosting website that hosts the content.

Operation 1422 depicts generating a security context including a ticket, the ticket configured to allow the client to acquire from a storage service a common view of a user's computing environment across one or more clients. For example, an authentication service 118 of internet based service provider 108 may create a ticket. The ticket may be operable to allow a client 102 to acquire a ticket for a common view of the user's computer environment stored on a storage service 114. More specifically, user account service of web portal may issue a ticket granting ticket that may be presented to a website in order to obtain a common view of a user's computing environment from the website. Even more specifically, MSN® may create a ticket granting ticket for a personal computer. The ticket granting ticket may be used by the personal computer to acquire a ticket that may be presented to a website that stores the look and feel of the user's computing environment so that each computer that the user 101 logs on to has the same desktop picture, the same file structure, and the same internet favorites.

Operation 1424 depicts generating a security context configured to allow the client to create an access token, wherein the access token includes security information for a logon session. For example, authentication service 118 of internet based service provider 108 may create a unique account identifier that includes one or more statements about the user 101. The computer system 102 may translate the unique account identifier into a security identifier that includes privileges and place the security identifier into an access token. More specifically, a user account service of a web portal may create an ID that includes claims about the user 101, e.g., statements made about the capabilities of a user 101. The ID may be used by the local security authority of a computer system to create an access token that includes a security identifier and a list of privileges associated with the user 101.

FIG. 15 illustrates the operational flow 1500 representing example operations relating to facilitating a computer logon session that optionally may include one or more of the operations 1502, 1504, 1506, 1508.

Operation 1500 begins the operational process. Operation 1502 illustrates transmitting a validation request to an internet based service provider, wherein said validation request includes a user's credentials, said credentials being verifiable by said internet based service provider. For example, a client 102, that includes a network connection 104 may transmit a request to be validated to an internet based service provider 108. The request may be generated by an operating system 112 of the client 102. The operating system 112 may generate such a request after receiving a user's credentials via a rendered logon field 106. The required credentials may be specified by a credential provider 120 based on the type of authentication package the client 102 uses to validate users. A more specific example may include a client 102, e.g., desktop computer, laptop computer, PDA, or any type of computing environment with an operating system, transmitting one or more packets of information indicative of a validation request over an Ethernet connection to the an internet based service provider, e.g., a web presence including at least a database of user accounts. The personal computer may have sent such a request after an authentication package, e.g., a software package that implements an authentication protocol that is used to authenticate the user was selected. The personal computer may then send one or more packets to the internet based service provider, e.g., a publicly accessible web entity, such as Google®, MSN®, Amazon.com®, The Newyorktimes.com®, Yahoo!®, or any web portal that maintains a database of user accounts. The one or more packets may include the logon information, e.g., the username and password of the user 101 such as Bob@webentity.com and Bob's password and the authentication package the computer uses to authenticate users.

Operation 1504 illustrates in response to said validation request, receiving a user security context from said internet based service provider. For example and in addition to the previous example, a client 102, may receive over a network connection 104 data from the specific internet based service provider 108 associated with a user's credentials, the data including data about the user 101. A more specific example may include a computer system that receives over it's Ethernet connection one or more packets indicative of information including a security context, e.g., a data structure that has security data relevant to logging into an operating system such as the user name associated with the user 101 or anything that can identify the user while they are logged into the computer system.

Operation 1506 illustrates utilizing said user security context to generate a token. For example and in addition to the previous example, an authenticating process 110 of an operating system 112 may utilize the data about the user 101 to determine whether the user has permission to logon locally either by being authorized directly or by being a member of an authorized group and if the user 101 is authorized the client 102 may generate a token, e.g., an object that contains information know about the user. More specifically, an authenticating subsystem, for example, the security authority of an operating system may utilize user information in the data structure and generate a token that includes information about the user 101.

Operation 1508 illustrates utilizing said token in a user login process, whereby said token is utilized to allow a user to access a local computing resource and to obtain user content from at least one storage service. For example and in addition to the previous example, an authenticating process 110 of an operating system 112 may create a logon session for user 101. Thereafter, the user 101 is may access one or more local computing resources, e.g., files stored locally on a client, the client itself, and/or any peripherals attached to the client. Additionally, the operating system 112 may utilize the token to receive content, e.g., movies, videos, pictures, bookmarks or internet favorites, files, operating system preferences, applications, services, or any other type of content from at least one storage service 114 through 114-N. More specifically, security authority of operating system 112 may log a user into a computer system. The computer system may use the token to allow access to the local system resources and retrieve a user's content from a website.

The foregoing detailed description has set forth various embodiments of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A method of facilitating a computer logon session comprising:
    receiving, by a logon screen generated by an operating system, a user's credential associated with the user, the operating system including a kernel;
    transmitting a validation request to an internet based service provider, wherein said validation request includes the user's credentials, said credentials being verifiable by said internet based service provider;

receiving information related to said user from said internet based service provider, wherein said information includes a security context;

utilizing, by an authentication process of the operating system, said user security context to generate an operating system security token;

logging said user into the operating system, wherein the operating system security token is used by said operating system to determine whether a user associated with the user's credential is authorized to use system resources; and using the security context to obtain content from one or more internet based service providers.

2. The method of claim 1, further comprising:
configuring the operating system to accept credentials associated with said internet based service provider.

3. The method of claim 1, further comprising:
rendering, by the operating system, a challenge after receiving incorrect credentials associated with said internet based service provider one or more times.

4. The method of claim 1, further comprising:
caching said security context, wherein said information includes a ticket, said ticket operable to acquire content associated with one or more storage services.

5. The method of claim 1, further comprising:
determining whether said user has permission to access content by checking the operating system security token;
transmitting a request for said content to one or more remote storage services; and
receiving said content from said one or more storage services.

6. The method of claim 1, further comprising:
transmitting a request to configure access rights for content associated with the user, wherein said access rights are operable to enable one or more additional users to access said content.

7. The method of claim 1, further comprising:
configuring a common view of the operating system.

8. The method of claim 1, wherein said transmitting a validation request to an internet based service provider further comprises:
transmitting a validation request to said internet based service provider, wherein validation of said user's credentials is required to access the system resources.

9. The method of claim 1, wherein said transmitting a validation request to an internet based service provider further comprises:
transmitting a validation request to said internet based service provider, wherein said internet based service provider is selected from a plurality of internet based service providers.

10. The method of claim 1, wherein said utilizing said security context to generate the operating system security token further comprises:
utilizing said security context to generate operating system security token that includes a security identifier, wherein said security identifier includes a user's privileges.

11. A computer system, comprising:
a processor;
a memory coupled to the processor, wherein the memory includes executable instructions that upon execution by the processor cause the computer system to:
receive, via an operating system log-on screen, a credential;
send the credential to an internet-based service provider;
receive a security context generated by the internet-based service provider;
generate an operating system logon token using information stored in the security context;
download, prior to logging a user associated with the logon token into the operating system, a file from the internet-based service provider;
log the user into the operating system using the operating system logon token, the operating system including a kernel; and
display, by the operating system, an icon for the downloaded file.

12. The computer system of claim 11, wherein the memory further comprises instructions that upon execution by the processor cause the computer system to:
open, by the operating system, a file stored in a file system of the operating system based on a privilege stored in the operating system logon token.

13. The computer system of claim 11, wherein said memory further comprises instructions that upon execution by the processor cause the computer system to:
select the internet-based service provider from a plurality of internet-based service providers.

14. The computer system of claim 11, wherein said memory further comprises that upon execution by the processor cause the computer system to:
send a request to set access control parameters for content associated with the security context to the internet-based service provider, wherein said access control parameters are operable to enable one or more additional users to access said content associated with the security context to the internet-based service provider.

15. The computer system of claim 11, wherein said memory further comprises that upon execution by the processor cause the computer system to:
send a request to access an administrative profile to the internet-based service provider, wherein the administrative profile is configured to manage one or more restricted profiles.

16. A computer-readable storage medium wherein the medium is not a signal including executable instructions that upon execution by a processor cause a computer system to facilitate a computer system logon session, the computer-readable storage medium comprising:
instructions that upon execution by the processor cause the computer system to display a logon screen for an operating system;
instructions that upon execution by the processor cause the computer system to receive, by the logon screen, a credential;
instructions that upon execution by the processor cause the computer system to transmit a validation request to an internet based service provider, wherein said validation request includes the credential, said credentials being verifiable by said internet based service provider;
instructions that upon execution by the processor cause the computer system to receive, in response to said validation request, a user security context from said internet based service provider;
instructions that upon execution by the processor cause the computer system to generate an operating system logon token from said user security context;
instructions that upon execution by the processor cause the computer system to log a user associated with the operating system logon token into the operating system, the operating system including a kernel, wherein the operating system is configured to use said operating system logon token to control access to local computing resources of the operating system; ; and instructions that upon execution by the processor cause the computer system to use the security context to obtain content from one or more internet based service providers.

17. The computer-readable storage medium of claim 16, further comprising:

instructions that upon execution by the processor cause the computer system to open a file stored in a file system of the operating system based on a privilege stored in the operating system logon token.

18. The computer-readable storage medium of claim 16, further comprising:

instructions that upon execution by the processor cause the computer system to select the internet based service provider from a plurality of internet based service providers.

19. The computer-readable storage medium of claim 16, further comprising:

instructions that upon execution by the processor cause the computer system to download, prior to logging the user into the operating system, a file from the internet based service provider; and instructions that upon execution by the processor cause the computer system to cause the operating system to display an icon for the downloaded file after logging the user into the operating system.

* * * * *